Oct. 19, 1943.  C. A. TOME  2,332,414
TUBE AND HEAD THEREFOR
Filed Sept. 12, 1941

INVENTOR
CHARLES A. TOME
PER
ATTORNEY

Patented Oct. 19, 1943

2,332,414

UNITED STATES PATENT OFFICE 2,332,414

TUBE AND HEAD THEREFOR

Charles A. Tome, Wilmington, Del.

Application September 12, 1941, Serial No. 410,505

2 Claims. (Cl. 221—60)

This invention is an improvement over the invention described in my application Serial No. 301,517 issued as Patent No. 2,258,395. In that application there is described a tube for dispensing merchandise, such as tooth paste, soap, medicines, and the like, having a body portion of some flexible, and preferably transparent, organic material such as cellulose acetate, the end of which is held in a head of plastic material by a flexible washer of reversible curvature.

It is an object of my invention to improve the head described in the said application. Another object of the invention is to support the washers which are used in assembling the elements of the tube. Other objects of the invention will be in part apparent and in part described hereinafter.

Figure 1:
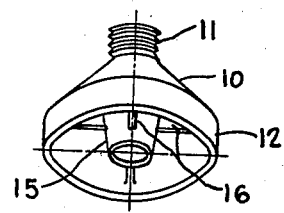
Figure 2:
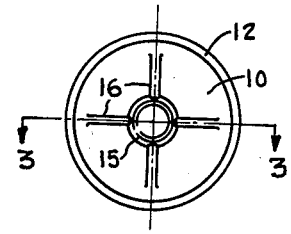
Figure 3:
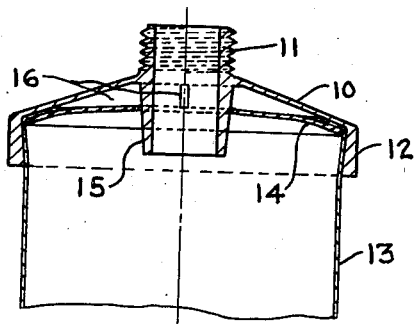

In the drawing Figure 1 is a perspective view of my improved head. Figure 2 is a view of my improved head taken from below. Figure 3 is a section on line III—III of Figure 2 with the tube and washer added.

In the drawing like numerals refer to like parts. 10 is the head; 11 is a screw-threaded nozzle on the head; 12 is a skirt forming a part of the head, which is undercut as shown in Figure 3. I have discovered that for many uses the undercutting need not be in the form of a groove, as shown in my said application, but may be a conical undercutting beginning at the edge of the skirt. 13 is a flexible tube; 14 in a washer to hold the tube in place. Both the tube and washer are of the kind described in my said application. 15 is a conical boss forming an inward extension of the nozzle; 16 are web-like supports integral with the head which both support the boss and may serve as stops and supports for the washer.

In assembling the device the conical boss receives the opening in the washer and serves to guide the washer to a properly alined position. Furthermore, when forces tend to collapse the washer, the boss serves to support it and to prevent its collapse. The webs 16 are so constructed that they prevent the assembly machine from sliding the washer too far up the conical boss and splitting it at its opening, and they oppose any tendency of the washer to collapse by flexing.

As many apparently widely different embodiments of this invention may be made without departing from the spirit and scope thereof, it is to be understood that I do not limit myself to the specific embodiments thereof except as defined in the appended claims.

I claim:

1. A tube having a flexible body, a comparatively rigid head with a cup-shaped recess to receive the end of the said flexible body, means for maintaining the head and body in sealed relationship comprising a thin and flexible member acting to press the body against the side of the recess, an opening in the flexible member and means on the head projecting within the said opening to take the lateral thrust of the said member.

2. A container of the class described comprising a comparatively rigid head having an orifice and having an annular skirt, a flexible tube having a portion within said skirt, a flexible washer acting to press the tube into sealed relation with the inside of the skirt and having a hole, and means on the head extending through the said hole and acting to brace the washer, said means being perforated to permit ejection of the contents of the tube through the orifice.

CHARLES A. TOME.